US006786336B2

(12) United States Patent
Boddu et al.

(10) Patent No.: US 6,786,336 B2
(45) Date of Patent: Sep. 7, 2004

(54) COMPOSITE BIOSORBENT FOR TREATMENT OF WASTE AQUEOUS SYSTEM(S) CONTAINING HEAVY METALS

(75) Inventors: Veera M. Boddu, Champaign, IL (US); Edgar Dean Smith, Seymour, IL (US)

(73) Assignees: The United States of America as represented by Secretary of the Army, Washington, DC (US); University of Illinois at Urbana-Champaign, Champaign, IL (US)

( * ) Notice: Subject to any disclaimer, the term of this patent is extended or adjusted under 35 U.S.C. 154(b) by 0 days.

(21) Appl. No.: 10/385,248

(22) Filed: Mar. 10, 2003

(65) Prior Publication Data

US 2003/0150802 A1 Aug. 14, 2003

Related U.S. Application Data (62) Division of application No. 09/912,627, filed on Jul. 24, 2001.
(60) Provisional application No. 60/222,180, filed on Aug. 1, 2000.

(51) Int. Cl.[7] ........................... B01D 24/00; B01J 39/00
(52) U.S. Cl. .................... 210/506; 210/502.1; 210/661; 210/688; 422/70; 502/404
(58) Field of Search ............................ 210/510.1, 656, 210/661, 729, 927, 502.1, 506, 688, 502; 422/70; 502/62, 400, 402, 404

(56) References Cited

U.S. PATENT DOCUMENTS

| | | | |
|---|---|---|---|
| 3,635,818 A | | 1/1972 | Muzzareli et al. |
| 4,462,982 A | | 7/1984 | Samejima et al. |
| 4,769,982 A | | 9/1988 | Kogiso et al. |
| 4,775,650 A | * | 10/1988 | Portier ......................... 502/62 |
| 4,879,340 A | | 11/1989 | Moriguchi et al. |
| 5,750,065 A | | 5/1998 | Kilbane |
| 5,766,312 A | | 6/1998 | Furhmann et al. |
| 5,789,204 A | | 8/1998 | Kogtev et al. |
| 5,900,479 A | | 5/1999 | Glasser et al. |
| 5,935,442 A | | 8/1999 | Lihme et al. |
| 6,042,877 A | | 3/2000 | Lyon et al. |
| 6,402,953 B1 | | 6/2002 | Gorovoj et al. |

OTHER PUBLICATIONS

Veera M. Boddu and Edgar D. Smith, A composite Chitosan Biosorbent for Adsorption of Heavy Metals from Waste Waters. U. S. Army Engineer Research & Development Center, Construction Engineering Research Laboratory, P.O. Box 9005, Champaigne, IL 61826–9005; 9 pages.

S. Z. Rogovina, G. A. Vikhoreva, T. A. Akopova, N. Gorbacheva; Investigation of Interaction of Chitosan with Solid Organic Acids and Anhydrides Under Conditions of Shear Deformation; Journal of Applied Polymer Science, Vo. 76–616–622 (20000), John Wiley & Sons, Inc.; 7 pages.

Veera M. Boddu, Krishnaiah Abburi, Jonathan L. Talbott and Edgare D. Smith; Removal of Hexavalent Chromium from Wastewater Using a New Composite Chitosan Biosorbent; American Chemical Society Published on Web Sep. 5, 2003; 8 pages.

Shameem Hasan, Abburi Krishnaiah, Tushar K. Ghosh, Dabir S. Viswanath, Veera M. Boddu and Edgar Smith; Adsorption of Chromium (VI) on Chitosan–Coated Perlite; Separation Science and Technology vol. 38, No. 15 2003; 19 pages.

* cited by examiner

Primary Examiner—W. L. Walker
Assistant Examiner—Krishnan S Menon
(74) Attorney, Agent, or Firm—Thompson Coburn, LLP (57) ABSTRACT

A biosorbent composition, process of preparing and use thereof wherein the biosorbent composition comprises a chitosan-coated substrate. Useful substrates include support materials such as a ceramic support material. The biosorbent composition of the instant invention is useful in treating aqueous systems, including wastewater and aqueous waste streams, by removing undesired heavy metals.

15 Claims, 6 Drawing Sheets

Figure 1: Photomicrograph of the Composite Chitosan Biosorbent showing the gross morphology Figure 2: Scanning electron micrographs of the Composite Chitosan Biosorbent at two different magnifications (a) 400X and (b) 800X Figure 3. Equilibrium adsorption isotherms for copper(II), nickel(II), arsenci (V) and chromium (VI)

◆ Copper (II)   ■ Chromium(VI)   ▲ Nickel(II)

Figure 4: Equilibrium adsorption of arsenic (III), arsenic(V), lead(II), and mercury(II)

Figure 5. Column adsorption of Cr(VI) from rinsewater collected from a chrome plating facility in Illinois

Figure 6

COMPOSITE BIOSORBENT FOR TREATMENT OF WASTE AQUEOUS SYSTEM(S) CONTAINING HEAVY METALS

This patent application is a Divisional of U.S. patent application Ser. No. 09/912,627, filed Jul. 24, 2001, which claims the benefit of priority under 35 U.S.C.§119(e) of U.S. Provisional Patent Application No. 60/222,180, filed Aug. 1, 2000. These applications are incorporated herein by reference in their entirety.

GOVERNMENTAL SUPPORT

This invention was made with United States Government support under Contract Number DACA88-98-D-0005-05 and DACA88-98-0005-10 awarded by the United States Army CERL. The United States Government may have certain rights in the invention.

This invention relates to a novel method of effective wastewater treatment using a novel composite biosorbent. More in particular, this invention relates to a new and effective method of wastewater treatment utilizing a chitosan-coated biosorbent to remove heavy metals from wastewater containing the same. In one embodiment this invention relates to a novel method for preparing a novel chitosan-coated biosorbent. In another embodiment this invention relates to a novel biosorbent composition.

In yet another embodiment, this invention presents a novel composite biosorbent prepared from a biological material with a high affinity for heavy metals. A chitosan-coated biosorbent has a high affinity for heavy metal adsorption. Chitosan is coated on to a support material, such as a ceramic support material, to provide support and stability to the biomaterial and to facilitate column flow conditions and enhance mass transfer characteristics of the biosorbent material.

BACKGROUND OF THE INVENTION

It is not uncommon for some industrial processes, businesses or even naturally occurring geographical or weather phenomena to produce aqueous waste streams which contain one or more undesirable heavy metals.

Conventional known methods of treating such aqueous waste streams contaminated with an undesired heavy metal (s) to remove one or more of the heavy metals include chemical precipitation as hydroxides or sulfides, chemical oxidation or reduction, evaporation, carbon adsorption, ion exchange, flotation, centrifugation and membrane separate technologies. The estimated cost of the treatment for heavy metal contaminated wastewater range from $0.20–2.00 per gallon approximately depending on the concentration and type of the metals present in the waste matrix. Despite the aforementioned, industries such as metal plating and finishing industries continue to seek higher efficiency and more cost-effective technologies for treating the above mentioned aqueous streams whereby the heavy metals are removed from the wastestreams containing the same.

OBJECTS OF THE INVENTION

It is an object of this invention to provide a novel biosorbent composition for the effective treatment of aqueous systems containing heavy metals.

It is an object of this invention to provide an improved process utilizing a novel biosorbent composition useful for the effective treatment of waste streams containing heavy metals.

It is an additional object of this invention to utilize a chitosan-coated support material as a biosorbent composition for the effective treatment of waste streams.

It is an additional object of this invention to produce a biosorbent composition by utilizing a support material and coating it with chitosan and its equivalents and the like.

It is a further object of this invention to provide a chitosan-coated ceramic substrate for use as a biosorbent composition in aqueous waste streams.

It is an object of this invention to provide an environmentally friendly process to remove undesirable heavy metals from wastewater.

These and other objects are provided in this invention which is described in more detail hereafter.

BRIEF SUMMARY OF THE INVENTION

This invention comprises a process for preparing a supported chitosan biosorbent useful for the treatment of wastewater which comprises preparing a ceramic support material, preparing a chitosan gel, and coating said chitosan gel to said ceramic support material. This invention further comprises a novel biosorbent composition as well as a process for preparing and utilizing a novel biosorbent utilizing chitosan, its equivalents and the like.

This invention also comprises a biosorbent composition comprising a support material coated with chitosan useful for treatment of wastewater.

This invention further comprises a process for treating aqueous systems containing heavy metals comprising adding a chitosan-coated biosorbent to an aqueous system.

This invention is further described in the detailed invention which follows.

DETAILED DESCRIPTION OF THE INVENTION

Chitosan has a structure chemically similar to cellulose. Chitosan has the repeating units of the saccharide pictured below.

Chitosan is a biomaterial derived from the deacetylation of chitin, a polysaccharide found in the exoskeleton of the shells of shrimp, crab and other arthropods.

Chitosan, useful for the practice of the instant invention described herein, is available from Aldrich Chemical (Aldrich Chemical Company Inc, 1001 W. Saint Paul Avenue, Milwaukee Wis. 53233-2641, USA).

Chitosans high affinity for metals adsorption is well documented in the literature. However, if chitosan is used in a flow column in its natural flake form, gelling and associated hydrodynamic flow problems arise due to the fact that the metal binding sites of the chitosan are not fully exposed for adsorption in its flake form. In order to overcome these problems, it has now been discovered that chitosan is coated on to a support material. It has further been discovered that support material facilitates column flow conditions and enhances mass transfer characteristics of the chitosan.

Support materials useful for the practice of the instant invention are appropriately selected so that the support material accepts and retains the chitosan gel of the instant invention for a sufficient time.

One embodiment of this invention comprises ceramic support materials coated with chitosan. Nonlimiting examples of ceramic support materials useful herein include alumina and silica (available from Aldrich Chemical Company, Inc., 1001 W.Saint Paul Avenue, Milwaukee, Wis. 53233-2641, USA and Sumitomo Chemical America, Inc., One California Street, Suit 2300, San Francisco, Calif. 94111, USA). Penile is also a support material useful for the practice of the instant invention.

A preferred support material is ultra fine ceramic alumina. Such useful ceramic alumina is available from Aldrich Chemical Company. Ultrafine ceramic alumina means having the property of particle size in the range of from about $10\mu$ to about $150\mu$.

The process for coating chitosan on to a support material of this invention comprises producing a chitosan gel, producing a support material, and coating the chitosan on to the support material. Processes such as dip coating and spin coating are useful for coating the chitosan gel on to the support material.

The process of dip coating comprises the steps of preparing a ceramic substrate, preparing a chitosan gel, surface coating the ceramic substrate with chitosan, filtration of the coated biosorbent and coating a second surface coating of chitosan on the ceramic substrate.

A substrate to be utilized for dip coating can be prepared by drying a selected substrate (such as a ceramic substrate) in an oven and then storing the dried substrate in a desiccator. This substrate then can then be mixed with an acid. After acid treatment the substrate should be washed and dried again.

A chitosan gel to be utilized for dip coating can be prepared by adding about 3 to 10 grams of medium molecular weight chitosan to 100 ml of 10 wt % acid under constant stirring and heat addition a viscous mixture is formed.

The now prepared chitosan gel can then be coated on to the acid treated and dried substrate by diluting the chitosan gel with water under heat. The acid treated substrate can then be added to the diluted gel and stirred for about 36 hours.

After stirring, the contents are allowed to settle, and any clear liquid produced is filtered out under vacuum. The filtered material (chitosan biosorbent) should be washed with deionized water and dried in an oven at 55° C. under vacuum for 24 hours. The dried chitosan biosorbent can then be stored for a second coat of chitosan.

A second coating of chitosan can be applied by treating the once coated substrate again with chitosan-acid gel under constant stirring conditions for approximately 24 hours. Again, the mixture is allowed to settle. The supernatant liquid can then be decanted. The solid, pasty material recovered can then be treated with 125 ml of 1 N NaOH. This alkaline mixture should then be stirred again and then washed. The now twice-coated biosorbent should then be allowed to dry under vacuum in an oven at 55° C. for about 48 hours before transferring to a desiccator till the biosorbent is ready for use.

The process of spin coating comprises preparation of a substrate and chitosan gel in the same manner as they would be prepared for dip coating. The chitosan gel is then placed on to the substrate by encapsulation.

Other coating processes useful for this invention include several microencapsulation processes such as coextrusion encapsulation and fluidized bed coating processes.

The chitosan of the instant invention adheres to the support material by electrostatic forces, van der Waals forces and hydrogen bonding. A nonlimiting material useful as a binding agent includes oxalic acid (available from Fischer Scientific, Fair Lawn, N.J. 07410, USA).

A chitosan-coated biosorbent has a high affinity for heavy metal adsorption. The term heavy metals, as used in this specification, is used to denote any metal which is not desirable for water, including metals which may be toxic to humans, animals or plants, or metals which give undesirable characteristics to water. Nonlimiting examples of heavy metals for which the instant invention has an affinity for include cesium, thorium, lead, mercury, arsenic and chromium mixtures thereof and the like.

The capacity of the biosorbent of the instant invention to remove heavy metals from water has been demonstrated. The chitosan biosorbent of the instant invention has a larger capacity for hexavalent chromium compared to that of pure chitosan or alumina by themselves.

The biosorbent of the instant invention is useful for the treatment of wastewaters. Nonlimiting examples of wastewaters include wastewater from metal plating facilities, groundwater contaminated with hexavalanet chromium and other metals, waste waters from nuclear power plants containing cesium, thorium and uranium, waste waters such as mercury contaminated water form dental offices, storm waters and drinking water/waste streams contaminated with lead, mercury and arsenic.

The biosorbent of the instant invention can be added to wastewater containing heavy metals or wastewater can be added to the biosorbent of the instant invention. An effective minimum contact time is necessary. An effective minimum contact time of about four to about eight hours is required for maximum adsorption capacity. The minimum contact time varies with the type of metal, concentration and temperature.

The biosorbent of the instant invention can be added to wastewater in a batch reactor to approach equilibrium conditions. Also, wastewater can be passed through a flow column filled with the biosorbent of the instant invention.

The amount of any particular metal removed from aqueous streams by unit mass of the biosorbent of the instant invention is evaluated in batch equilibrium adsorption studies. The biosorbent of the instant invention adsorbs two to three fold more metal ions from aqueous streams when tested in evaluation studies compared to chitosan in its natural flake form.

Once heavy metals have adhered to the biosorbent of the instant invention they can then be removed from the wastewater. Nonlimiting processes useful for the removal of the biosorbent of the instant invention with heavy metals adhered thereto include regeneration of the biosorbent loaded with heavy metals using 0.1 molar solution of sodium hydroxide (available from Aldrich Chemical Company).

Once the chitosan with undesired heavy metals attached has been removed from the wastewater, the wastewater is purer than it was before the treatment. After treatment with the biosorbent of the instant invention, wastewater will be purer than it would have been without treatment.

The biosorbent product of the instant invention is appropriately characterized by electron microscopy and evaluated by the sorption of copper 2+, chromium 3+, chromium 6+, lead 2+, mercury 2+ and nickel 2+.

Use of the Chitosan Biosorbent

Adsorption is a well-developed separation process. Therefore extensive equipment design and development work is not required to use the biosorbent. Traditional adsorption process equipment can be used for the biosorbent-base processes. Any waste stream, containing metals can be treated with the biosorbent. One such waste stream is rinse water from metal plating and finishing operations. The biosorbent can also be used for removing lead, arsenic, mercury and other toxic metals from drinking water resources (e.g. groundwater, water from private bore wells, and etc.). Special waste waters such as mercury contaminated water form dental offices can be treated with a cartridge filled with the biosorbent. Waste waters for nuclear power plants containing cesium, thorium and uranium may also be treated with the biosorbent.

EXAMPLES

The examples herein are illustrations of various embodiments of this invention and are not intended to limit it in any way.

Example I

Overall—Preparation of Chitosan Biosorbents of this Invention

A nonlimiting method to prepare the chitosan biosorbents of the instant invention is by dip coating the ceramic substrate with chitosan gel. Dip coating preparation of chitosan biosorbents involves the steps of preparing a ceramic substrate, preparing a chitosan gel, surface coating the ceramic substrate with chitosan, filtration of the coated biosorbent and coating a second surface coating of chitosan on the ceramic substrate.

A. Preparation of the Ceramic Substrate

Ceramic alumina of selected particle size was dried in an oven for four hours. at 110° C. and stored in a desiccator. Small batches of the alumina were mixed with oxalic acid or acetic acid and stirred for 1 hour at room temperature. The acid from the mixture was filtered and washed twice with about 200–300 ml deionized water and filtered again. The acid treated alumina was dried in an oven at about 70° C. under vacuum for 24 hours The acid treated alumina was stored in a desiccator.

B. Preparation of Chitosan Gel

Organic acids such as acetic acid or oxalic acids can be utilized for dissolving chitosan. About 3 to 10 grams of medium molecular weight chitosan supplied by Aldrich Chemical is slowly added to 100 ml of the 10 wt % acid while stirring constantly with a magnetic bar. The acid and chitosan formed a viscous mixture, and it was heated to 40–50° C. to facilitate mixing. At room temperature the chitosan-acetic acid mixture formed a transparent gel, while the chitosan-oxalic acid formed a wheatish color gel.

C. Surface Coating of Ceramic Substrate with Chitosan

A known amount, about 20–40 ml of the chitosan gel was diluted with approximately 50 ml of water and heat to about 40–50° C. in a 250 ml conical flask. About 30–50 grams of the acid treated alumina was slowly added to the diluted gel and stirred for about 36 hours.

D. Filtration of Coated Biosorbent Material

The contents of the conical flask were then allowed to settle, and the clear liquid is filtered out under vacuum with Whatman 41 filter paper (Whatman Inc., 9 Bridewell Place, Clifton, N.J. 07014, USA). The filtered material (chitosan biosorbent) was washed twice with deionized water and dried in the oven at 55° C. under vacuum for 24 hours. The dried chitosan biosorbent was stored in a glass bottle for a second coat of chitosan later.

E. Second Coating of Chitosan

The once coated alumina was treated again with chitosan-oxalic acid gel, approximately 75 ml, for 24 hours under constant stirring conditions. After the 24 hours, the mixture was allowed to settle. The supernatant liquid was decanted and the solid, pasty material was treated with 125 ml of 1 N NaOH. The alkaline mixture was stirred again for two hours. Later the mixture was washed with about 250 ml deionized water and filtered. The twice-coated biosorbent was then allowed to dry in the oven under vacuum at 55° C. for about 48 hours. The dried biosorbent was transferred to a glass bottle and stored in a desiccator.

A spin coating process may also be used to coat chitosan gel on to a support material such as ceramic particles.

Example II

Gross and Surface Morphology

Figure 1:
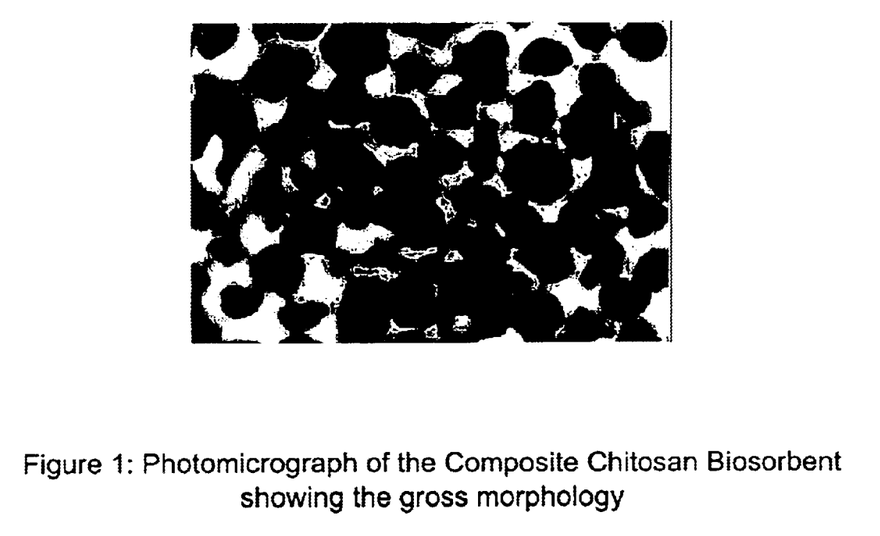
FIG. 1 is a photomicrograph of the biosorbent of the instant invention.
Figure 2:
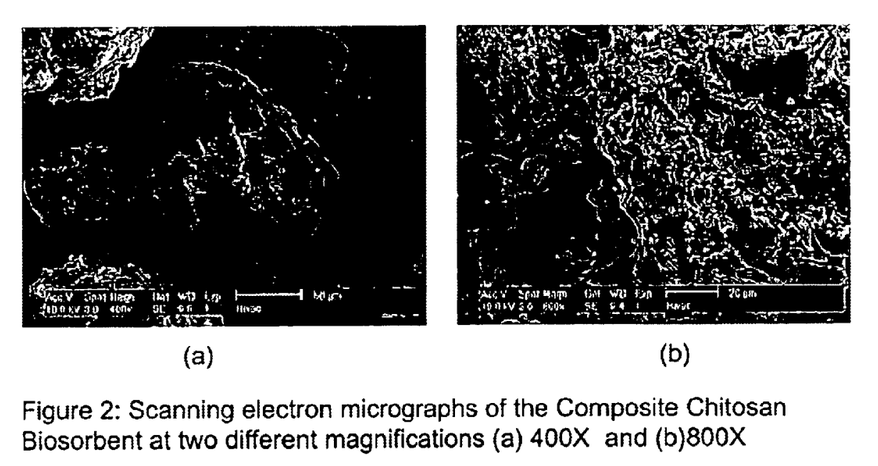
FIGS. 2(a) and 2(b) are scanning electron micrographs of the biosorbent of the instant invention.

The biosorbent of the instant invention was observed under a scanning electron microscope (SEM) and a photomicroscope. An epifluorescence photomicrograph and a couple of scanning electron micrographs of the biosorbent are shown in FIGS. 1 and 2 respectively. These figures show gross and surface morphology of the biosorbent of the instant invention.

Example III

Equilibrium Adsorption Studies

Figure 3:
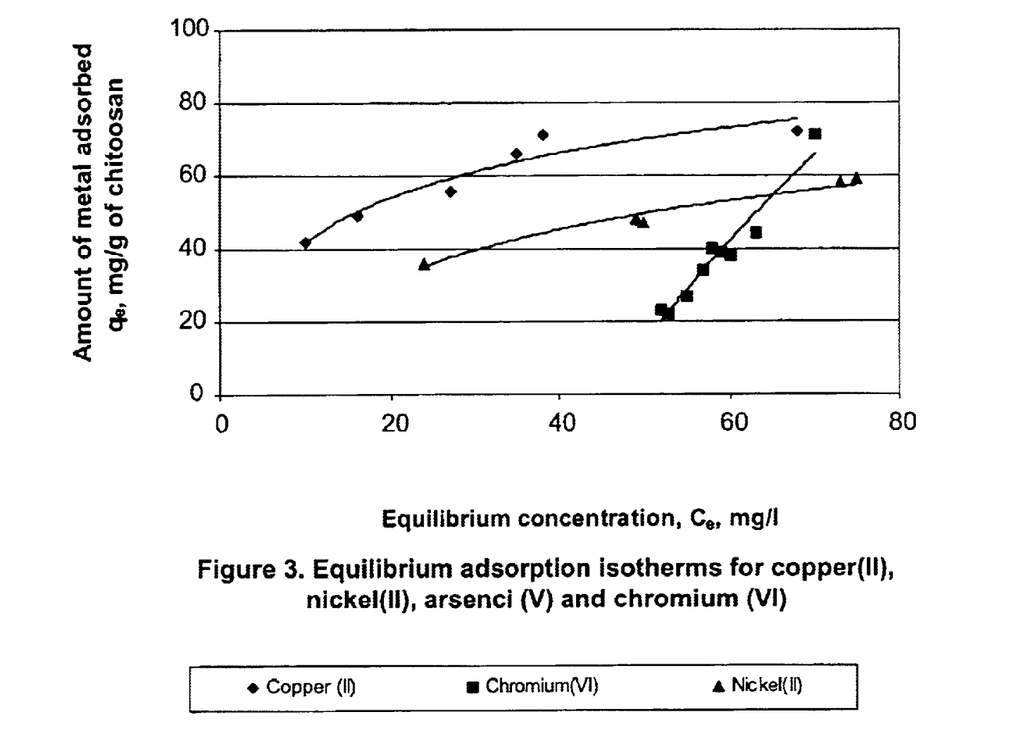
FIGS. 3 and 4 are equilibrium evaluations of the biosorbent of the instant invention with wastewater containing various metals.
Figure 4:
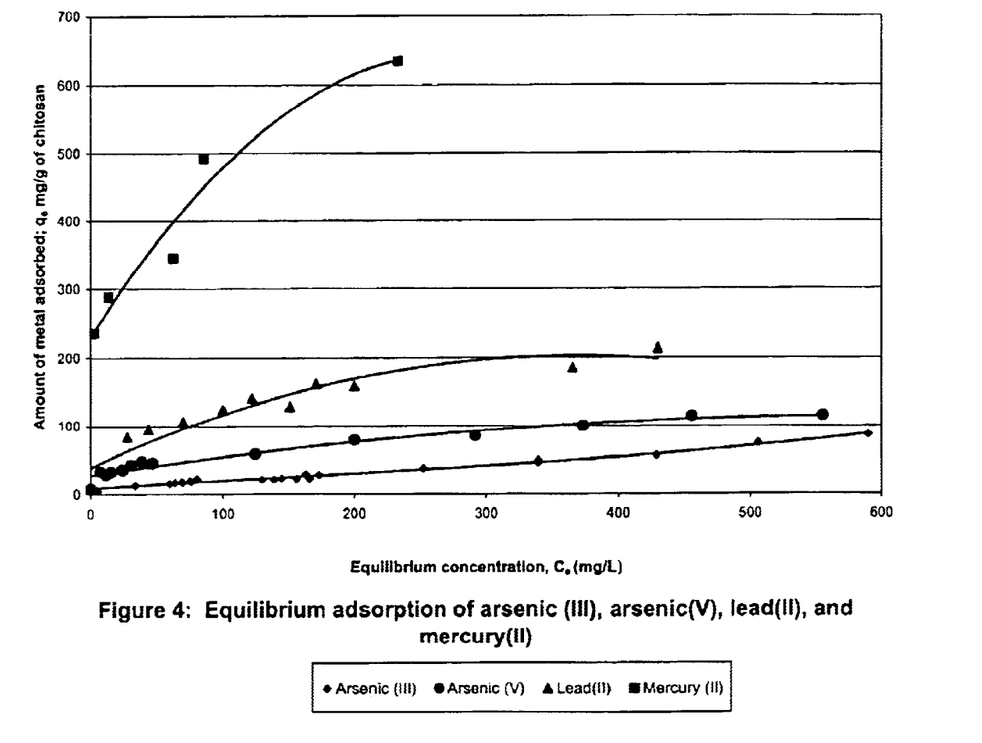

Equilibrium adsorption isotherms were obtained for metals As 5+, As 3+, Cu 2+, Cr 6+, Ni 2+, Pb 2+ and Hg 2+. The equilibrium experiments were conducted at 25° C. with equilibration contact times up to about 48 hours. The concentration of metals in the supernatant liquids were analyzed using UV/atomic absorption spectroscopy or ion chromatography. Results of the equilibrium studies are shown in FIGS. 3 and 4.

Example IV

Column Studies

Figure 5:
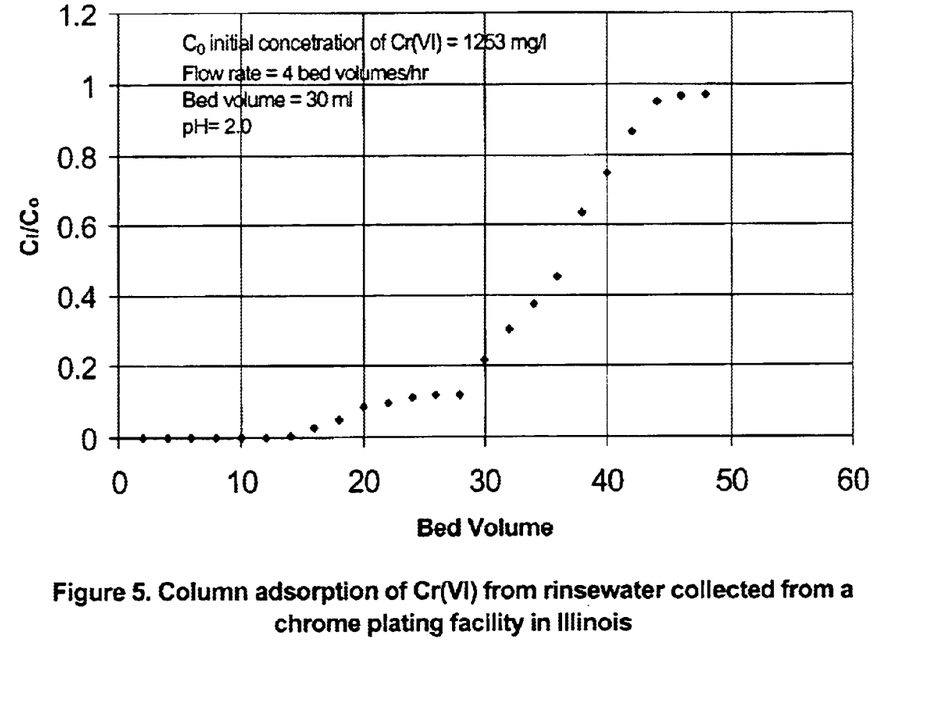
FIG. 5 is an evaluation of the biosorbent of the instant invention in a flow column setup.

Column breakthrough studies with chromium, nickel, lead, mercury and cadmium were conducted. A glass column 1 cm in diameter and 30 cm in length with annular jacket for circulating water for maintaining the temperature was used in this study. Results of chromium (VI) adsorption from electroplating rinsewater are shown in FIG. 5. A column breakthrough is observed at about 15 bed volumes with the feed solution containing 1253 mg/L of chromium (VI).

Thus, it is apparent that there has been provided, in accordance with the instant invention, a process that fully satisfies the objects and advantages set forth herein above. While the invention has been described with respect to various specific examples and embodiments thereof, it is understood that the invention is not limited thereto and many alternatives, modifications and variations will be apparent to those skilled in the art in light of the foregoing description. Accordingly, it is intended to embrace all such alternatives, modifications and variations as fall within the spirit and broad scope of the invention.

DETAILED DESCRIPTION OF THE DRAWINGS

FIG. 1 is a photomicrograph of the composite chitosan biosorbent showing the gross morphology. FIG. 1 is a micrograph of the biosorbent prepared with 150 mesh size alumina ceramic.

FIGS. 2(a) and 2(b) are scanning electron micrographs of the composite chitosan biosorbent of the instant invention. FIG. 2(a) is a scanning electron micrograph at 400×. FIG. 2(b) is a scanning electron micrograph at 800×.

FIG. 3 is an equilibrium evaluation of the biosorbent of the instant invention with wastewater containing copper (II), chromium (VI) and nickel (II).

FIG. 4 is an equilibrium evaluation of the biosorbent of the instant invention with wastewater containing arsenic (III), arsenic (V), lead (II) and mercury (II).

FIG. 5 is an evaluation of the biosorbent of the instant invention in a flow column setup. FIG. 5 depicts column adsorption of chromium (VI) from rinsewater collected from a chrome plating facility in Illinois.

Figure 6:
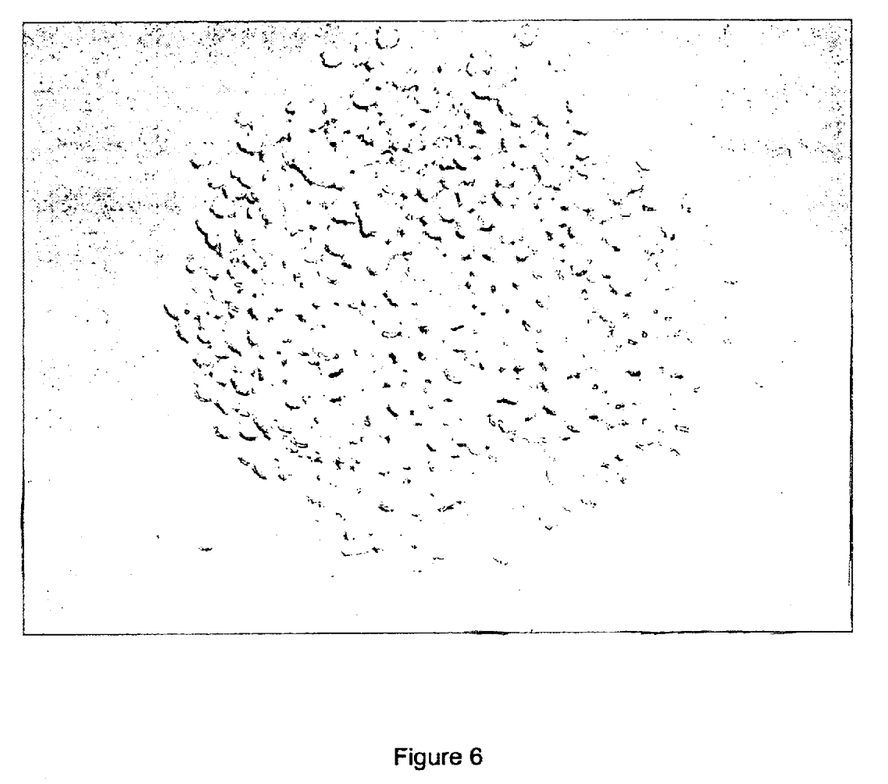
FIG. 6 is a photomicrograph of the biosorbent of the instant invention utilizing perlite as a support material.

FIG. 6 is a photomicrograph of the composite chitosan biosorbent showing the gross morphology when perlite is utilized as the ceramic support material.

What is claimed is:

1. A process for preparing a supported chitosan biosorbent useful for the treatment of wastewater which comprises preparing a ceramic support material, preparing a chitosan gel, and coating said chitosan gel to said ceramic support material, wherein said ceramic support material comprises acid treated alumina prepared by drying ceramic alumina, mixing the dry ceramic alumina with an acid to form a mixture, filtering and washing the mixture to prepare a washed mixture, and drying the washed mixture.

2. The process of claim 1 wherein a second surface coating of chitosan gel is applied to said supported chitosan biosorbent.

3. The process of claim 1 wherein said chitosan gel is prepared by dissolving chitosan in an acid.

4. The process of claim 3 wherein said acid is an organic acid.

5. The process of claim 4 wherein said organic acid is selected from the group consists of acetic and oxalic acid.

6. The process of claim 1 wherein said chitosan-coated biosorbent is filtered under a vacuum, washed, dried and coated with a second layer of chitosan gel.

7. A process for preparing a biosorbent useful for the treatment of wastewater which comprises preparing a ceramic support material, preparing a gel, and coating said gel to said ceramic support material, wherein said gel comprises chitosan, its equivalents and the like, wherein said ceramic support material comprises acid treated alumina prepared by drying ceramic alumina, mixing the dry ceramic alumina with an acid to form a mixture, filtering and washing the mixture to prepare a washed mixture, and drying the washed mixture.

8. A process for preparing a supported chitosan biosorbent useful for the treatment of wastewater which comprises preparing a ceramic support material, preparing a chitosan gel, and coating said chitosan gel to said ceramic support material, wherein said ceramic support material is prepared by mixing the ceramic support material with an acid, filtering and washing the ceramic support material, and drying the ceramic support material.

9. The process of claim 8 wherein said support material comprises perlite.

10. The process of claim 8, wherein said acid is an organic acid.

11. The process of claim 10, wherein said acid is selected from the group consisting of acetic acid and oxalic acid.

12. The process of claim 8, wherein a second surface coating of chitosan gel is applied to said supported chitosan biosorbent.

13. The process of claim 8, wherein said chitosan gel is prepared by dissolving chitosan in an acid.

14. The process of claim 13, wherein said chitosan gel is prepared by dissolving chitosan in an organic acid.

15. The process of claim 14, wherein said chitosan gel is prepared by dissolving chitosan in acetic acid or oxalic acid.

* * * * *